US008963937B2

(12) United States Patent
Yang

(10) Patent No.: US 8,963,937 B2
(45) Date of Patent: Feb. 24, 2015

(54) DISPLAY CONTROLLER DRIVER AND TESTING METHOD THEREOF

(75) Inventor: Hsing-Chien Yang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 774 days.

(21) Appl. No.: 13/211,336

(22) Filed: Aug. 17, 2011

(65) Prior Publication Data

US 2012/0206465 A1 Aug. 16, 2012

Related U.S. Application Data

(60) Provisional application No. 61/441,292, filed on Feb. 10, 2011.

(51) Int. Cl.
*G06F 13/372* (2006.01)
*G06F 3/038* (2013.01)
*G09G 5/00* (2006.01)

(52) U.S. Cl.
CPC .................................. *G06F 13/372* (2013.01)
USPC ......................................... 345/534; 345/204

(58) Field of Classification Search
CPC ....... G06F 11/073; G06F 12/00; G09G 5/395; G09G 5/363; G09G 5/001; G09G 5/222
USPC ....................................................... 345/534
See application file for complete search history.

(56) References Cited

U.S. PATENT DOCUMENTS

| | | | |
|---|---|---|---|
| 2004/0085275 A1* | 5/2004 | Sugiyama et al. | 345/87 |
| 2004/0153924 A1* | 8/2004 | Shinagawa et al. | 714/724 |
| 2007/0252828 A1 | 11/2007 | Bae et al. | |
| 2010/0142383 A1* | 6/2010 | Goishi et al. | 370/250 |
| 2011/0288810 A1* | 11/2011 | Ishikawa et al. | 702/123 |
| 2012/0206465 A1* | 8/2012 | Yang | 345/534 |
| 2013/0036335 A1* | 2/2013 | Kim et al. | 714/704 |

FOREIGN PATENT DOCUMENTS

| | | |
|---|---|---|
| CN | 1551064 | 12/2004 |
| CN | 101197114 | 6/2008 |
| CN | 101599256 | 12/2009 |
| CN | 101901573 | 12/2010 |
| GB | 2329741 | 3/1999 |
| JP | 10-171441 | 6/1998 |
| TW | 448369 | 8/2001 |
| TW | 200417952 | 9/2004 |
| TW | 200609878 | 3/2006 |
| TW | 200807301 | 2/2008 |
| TW | M368179 | 11/2009 |

* cited by examiner

*Primary Examiner* — Andrew Sasinowski
*Assistant Examiner* — Mihir Rayan
(74) *Attorney, Agent, or Firm* — Jianq Chyun IP Office

(57) ABSTRACT

A display controller driver and a testing method thereof are provided. The display controller driver includes an image data memory, a timing control circuit, and a data line driving circuit. The image data memory stores display data. The timing control circuit obtains the display data from the image data memory. The data line driving circuit is coupled to the timing control circuit. The data line driving circuit receives the display data and outputs a grayscale voltage signal corresponding to the display data through at least one data-line output terminal of the display controller driver. In a test operation mode, the timing control circuit further transmits the display data from the image data memory to at least one test output port of the display controller driver.

14 Claims, 12 Drawing Sheets

DISPLAY CONTROLLER DRIVER AND TESTING METHOD THEREOF

CROSS-REFERENCE TO RELATED APPLICATION

This application claims the priority benefits of U.S. provisional application Ser. No. 61/441,292, filed on Feb. 10, 2011 and Taiwan application serial no. 100121981, filed on Jun. 23, 2011. The entirety of each of the above-mentioned patent applications is hereby incorporated by reference herein and made a part of this specification.

BACKGROUND OF THE INVENTION

1. Field of the Invention

The invention generally relates to a display device, and more particularly, to a display controller driver for driving a display panel and a testing method thereof.

2. Description of Related Art

FIG. 1A is a block diagram of a conventional display controller driver. Referring to FIG. 1A, the conventional display controller driver 100 is connected to an external processor 110 and a display panel 140. The display controller driver 100 includes a system interface circuit 120, a memory control circuit 122, an image data memory 124, a timing control circuit 126, a shift register 128, a data line driving circuit 130, a grayscale voltage generating circuit 132, and a gate line driving circuit 134. The system interface circuit 120 is coupled to the external processor 110, and the data line driving circuit 130 and the gate line driving circuit 134 are coupled to the display panel 140.

When the display controller driver 100 works in a normal operation mode, the processor 110 sends display data to the memory control circuit 122 through the system interface circuit 120. The memory control circuit 122 temporarily stores the display data into the image data memory 124. The processor 110 sends control signals to the timing control circuit 126 through the system interface circuit 120. The timing control circuit 126 issues corresponding control signals to the memory control circuit 122, the shift register 128, the data line driving circuit 130, the gate line driving circuit 134, and the grayscale voltage generating circuit 132 in time sequence. The timing control flow is described below. The timing control circuit 126 reads image data from the image data memory 124 through the memory control circuit 122 and sends the image data to the shift register 128. The shift register 128 latches the image data according to a latch pulse of the timing control circuit 126 and sends the latched image data to the data line driving circuit 130. The timing control circuit 126 also issues control signals according to a predetermined timing to control the data line driving circuit 130 and the gate line driving circuit 134 to send the image data into pixels of the display panel 140, so as to display a corresponding image.

FIG. 1B is a timing diagram of a normal operation flow of the display controller driver 100. After display data in the first row is read from the image data memory 124 and input into the shift register 128, the timing control circuit 126 issues a latch enable signal to the data line driving circuit 130 to store the first row of display data into the data line driving circuit 130. After that, the timing control circuit 126 issues an output enable signal to the data line driving circuit 130 to output the first row of display data from the data line driving circuit 130 to the display panel 140 to display it. At the same time when the data line driving circuit 130 outputs the first row of display data, display data in the second row is read from the image data memory 124 and input into the shift register 128. During the next display cycle, the data line driving circuit 130 outputs the second row of display data. All the display data is output to the display panel 140 through the data line driving circuit 130 based on foregoing time sequence.

When a test operation is performed on the display controller driver 100, the display controller driver 100 works in a test operation mode, and the external processor 110 (for example, a test platform) needs to write a test pattern into the image data memory 124 beforehand through the system interface circuit 120 and the memory control circuit 122 to test the image data memory 124. Namely, in the test operation mode, the external processor 110 tests whether image data (i.e., the test pattern) can be correctly stored into the image data memory 124. Referring to FIG. 1C, in foregoing test operation mode, the entire transmission path of the test pattern includes a write path 112 and a read path 114. The write path 112 is sequentially composed of the processor 110, the system interface circuit 120, the memory control circuit 122, and the image data memory 124. The read path 114 is sequentially composed of the image data memory 124, the memory control circuit 122, the system interface circuit 120, and the processor 110. The test pattern is stored into the image data memory 124 through the write path 112, then read out from the image data memory 124, and sent to the processor 110 (for example, a test platform) through the read path 114.

FIG. 1D illustrates the entire test flow. First, in step S210, the external processor 110 writes the test pattern into the image data memory 124 via the write path 112. Then, in step S220, the external processor 110 reads the test pattern from the image data memory 124 via the read path 114 (i.e., the system interface circuit 120). Next, in step S230, the external processor 110 determines whether the test pattern read from the image data memory 124 matches a predetermined pattern. If the test pattern read from the image data memory 124 does not match the predetermined pattern (i.e., the test is not passed), the test flow ends in step S250. If the test pattern read from the image data memory 124 matches the predetermined pattern (i.e., the test is passed), in step S240, whether the test pattern is the last test pattern is determined. If it is determined in step S240 that the test pattern is the last test pattern, the test flow ends in step S250. If it is determined in step S240 that the test pattern is not the last test pattern, step S210 is executed again to test the next test pattern.

FIG. 2A is a timing diagram when the processor 110 writes test patterns into and reads test patterns from the display controller driver 100 having a QVGA resolution (i.e., 240× 320), wherein the upper portion is the timing diagram of the writing operation, and the lower portion is the timing diagram of the reading operation. Referring to FIG. 2A, CSX, WRX, D/CX, and RDX are control signals issued by the processor 110 to the display controller driver 100. D is a bidirectional data bus connected between the processor 110 and the display controller driver 100. The control signal CSX is a chip selection signal, the control signal WRX is a write enable signal, the control signal D/CX indicates whether a current signal on the bidirectional data bus D is "command" or "data", and the control signal RDX is a read enable signal. When a test pattern is written, the processor 110 sends a command (marked as "COMMAND" in FIG. 2A) and the test pattern (marked as "DATA" in FIG. 2A) to the display controller driver 100. When a test pattern is read, the display controller driver 100 sends the previously written test pattern to the processor 110.

A write cycle mentioned below refers to the time for writing a command or data, and a read cycle refers to the time for reading a data. The data marked with "DUMMY" in FIG. 2A is a redundant data instead of real data. Regarding a conventional display controller driver 100 having a QVGA resolution, the write cycle is 65 nanoseconds (ns), and the read cycle is 450 ns. Taking two test patterns as an example, the time (about 79 milliseconds (ms)) for executing one test operation can be calculated by using following formula:

$$[65\times(320\times240+1)+65+(320\times240+1)\times450]\times2=79105160 \text{ ns.}$$

FIG. 2B is a timing diagram when the processor 110 writes test patterns into and reads test patterns from the display controller driver 100 having a WVGA resolution (i.e., 480×864), wherein the upper portion is the timing diagram of the writing operation, and the lower portion is the timing diagram of the reading operation. FIG. 2B can be referred to the descriptions related to FIG. 2A. When a test pattern is written, the processor 110 sends a command (marked as "COMMAND" in FIG. 2B) and the test pattern (marked as "DATA" in FIG. 2B) to the display controller driver 100. When a test pattern is read, the display controller driver 100 sends the previously written test pattern to the processor 110. Regarding a conventional display controller driver 100 having a WVGA resolution, the write cycle is 33 ns, and the read cycle is 400 ns. Taking two test patterns as an example, the time (about 359 ms) for executing one test operation can be calculated by using following formula:

$$[33\times(864\times480+1)+33+(864\times480+1)\times400]\times2=359148452 \text{ ns.}$$

In the conventional display controller driver structure described above, when a test operation is performed on the display controller driver 100, the testing time cannot be shortened due to the communication protocol adopted by the transmission interface and the restriction of the single transmission channel (the bidirectional data bus D).

SUMMARY OF THE INVENTION

Accordingly, the invention is directed to a display controller driver and a testing method thereof with shortened testing time.

An embodiment of the invention provides a display controller driver including an image data memory, a timing control circuit, and a data line driving circuit. The image data memory stores display data. The timing control circuit obtains the display data from the image data memory. The data line driving circuit is coupled to the timing control circuit. The data line driving circuit receives the display data and outputs a grayscale voltage signal corresponding to the display data through at least one data-line output terminal of the display controller driver. In a test operation mode, the timing control circuit further transmits the display data from the image data memory to at least one test output port of the display controller driver.

An embodiment of the invention provides a testing method of a display controller driver. The display controller driver includes a timing control circuit, an image data memory, and a data line driving circuit. The testing method includes following steps. A display data is stored into the image data memory. The display data is transmitted from the image data memory to the timing control circuit. The display data is transmitted from the timing control circuit to the data line driving circuit, wherein the data line driving circuit outputs a grayscale voltage signal corresponding to the display data through at least one data-line output terminal of the display controller driver. In a test operation mode, the display data is transmitted from the image data memory to at least one test output port of the display controller driver by using the timing control circuit.

According to an embodiment of the invention, the timing control circuit further includes at least one output terminal coupled to the test output port. In the test operation mode, the timing control circuit transmits the display data from the image data memory to the test output port through the output terminal.

According to an embodiment of the invention, the display controller driver further includes a system interface circuit. The system interface circuit provides a communication interface between the display controller driver and an external processor, wherein the processor stores the display data into the image data memory through the system interface circuit.

According to an embodiment of the invention, the display controller driver further includes a memory control circuit coupled between the system interface circuit and the image data memory. The processor stores the display data into the image data memory through the system interface circuit and the memory control circuit, and the timing control circuit obtains the display data from the image data memory through the memory control circuit.

According to an embodiment of the invention, the system interface circuit is coupled to the test output port. In the test operation mode, the timing control circuit transmits the display data from the image data memory to the test output port through the system interface circuit.

According to an embodiment of the invention, the test output port is turned off and does not output any signal when the display controller driver works in a normal operation mode.

As described above, when the display controller driver works in the test operation mode, the write path and read path of test patterns are different transmission paths. Thereby, the display controller driver provided by an embodiment of the invention can greatly shorten the testing time.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
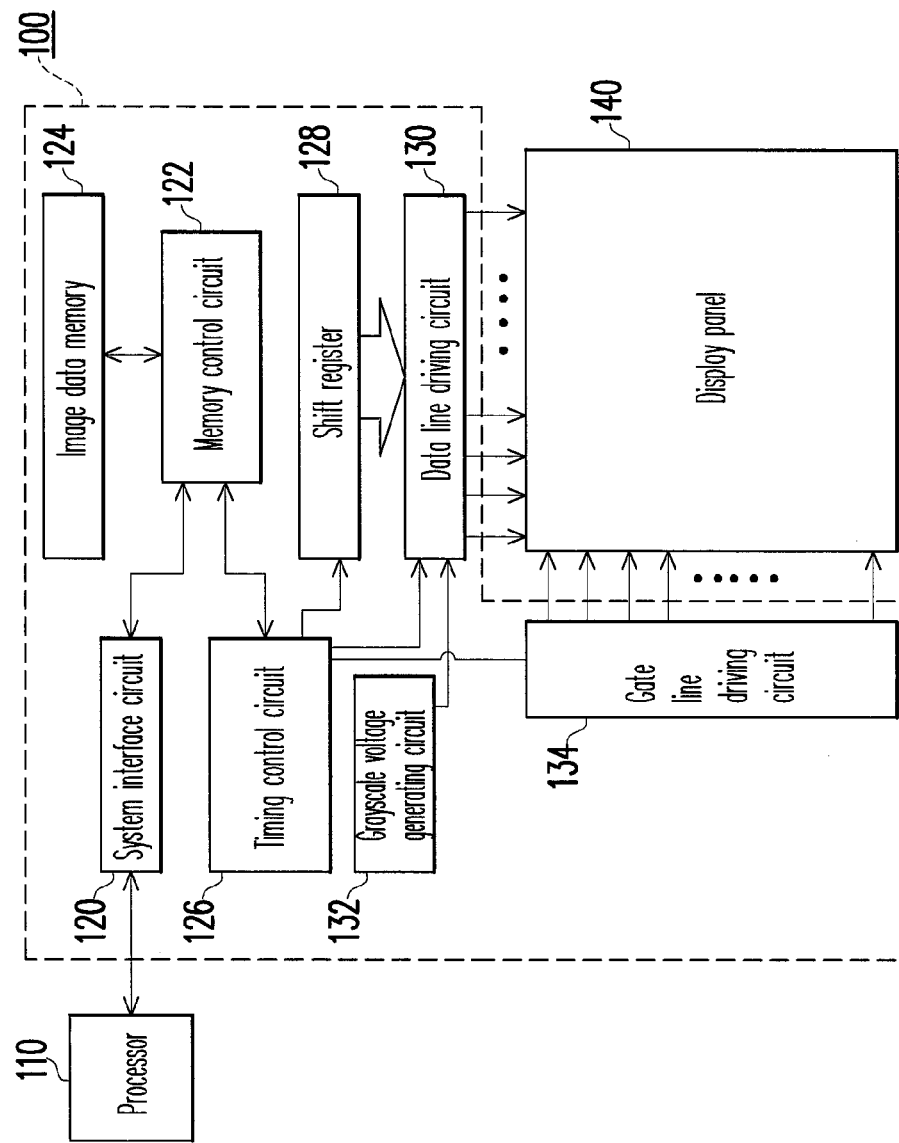
FIG. 1A is a block diagram of a conventional display controller driver.
Figure 1B:
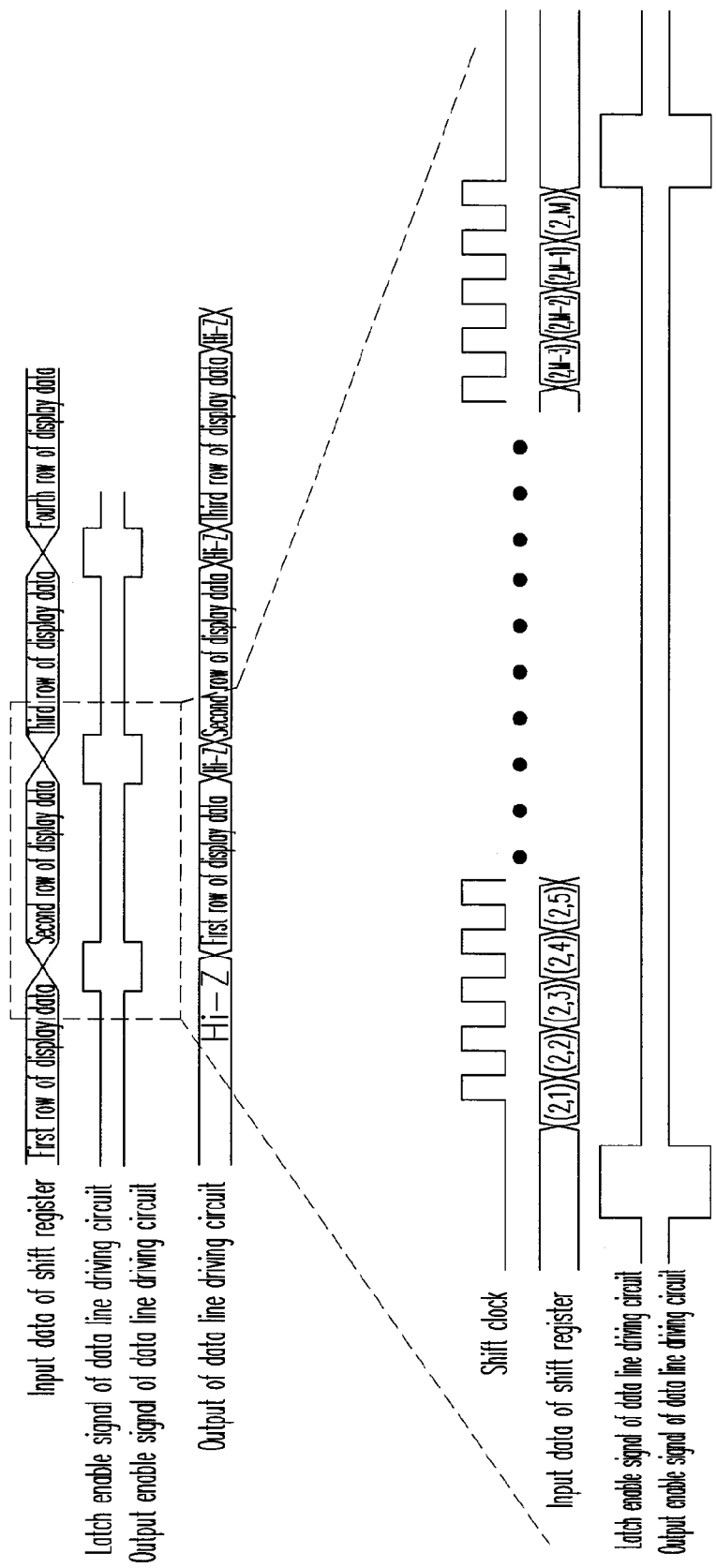
FIG. 1B is a signal timing diagram of the display controller driver in FIG. 1A in a normal operation mode.
Figure 1C:
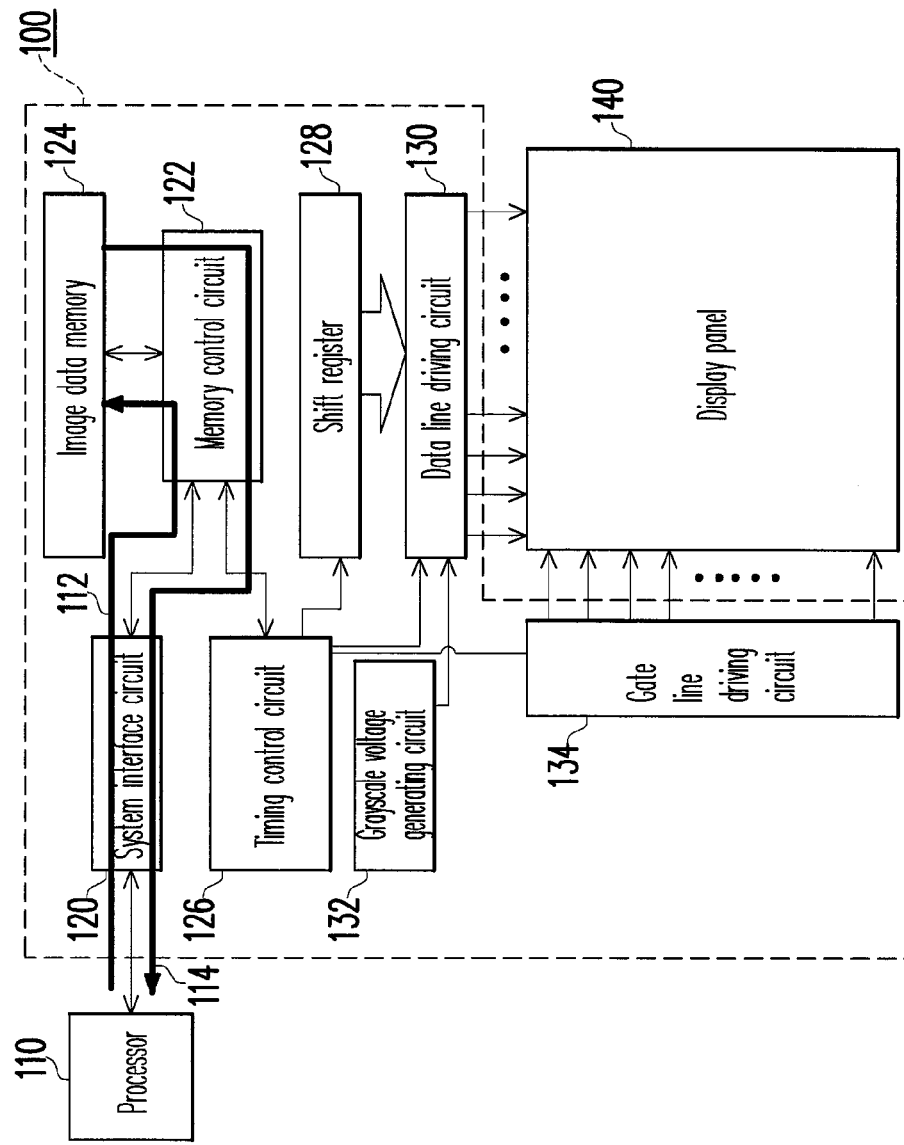
FIG. 1C is a diagram illustrating test pattern transmission paths of the display controller driver in FIG. 1A in a test operation mode.
Figure 1D:
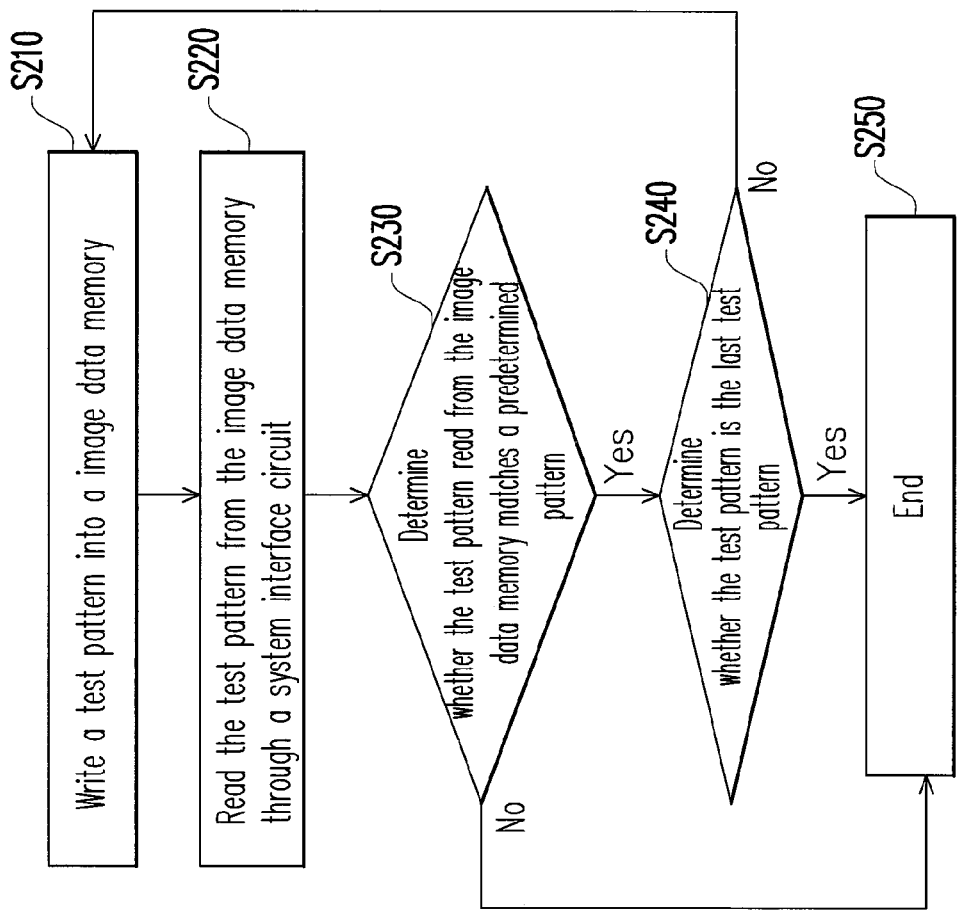
FIG. 1D illustrates an operation flow in the test operation mode in FIG. 1C.
Figure 2A:
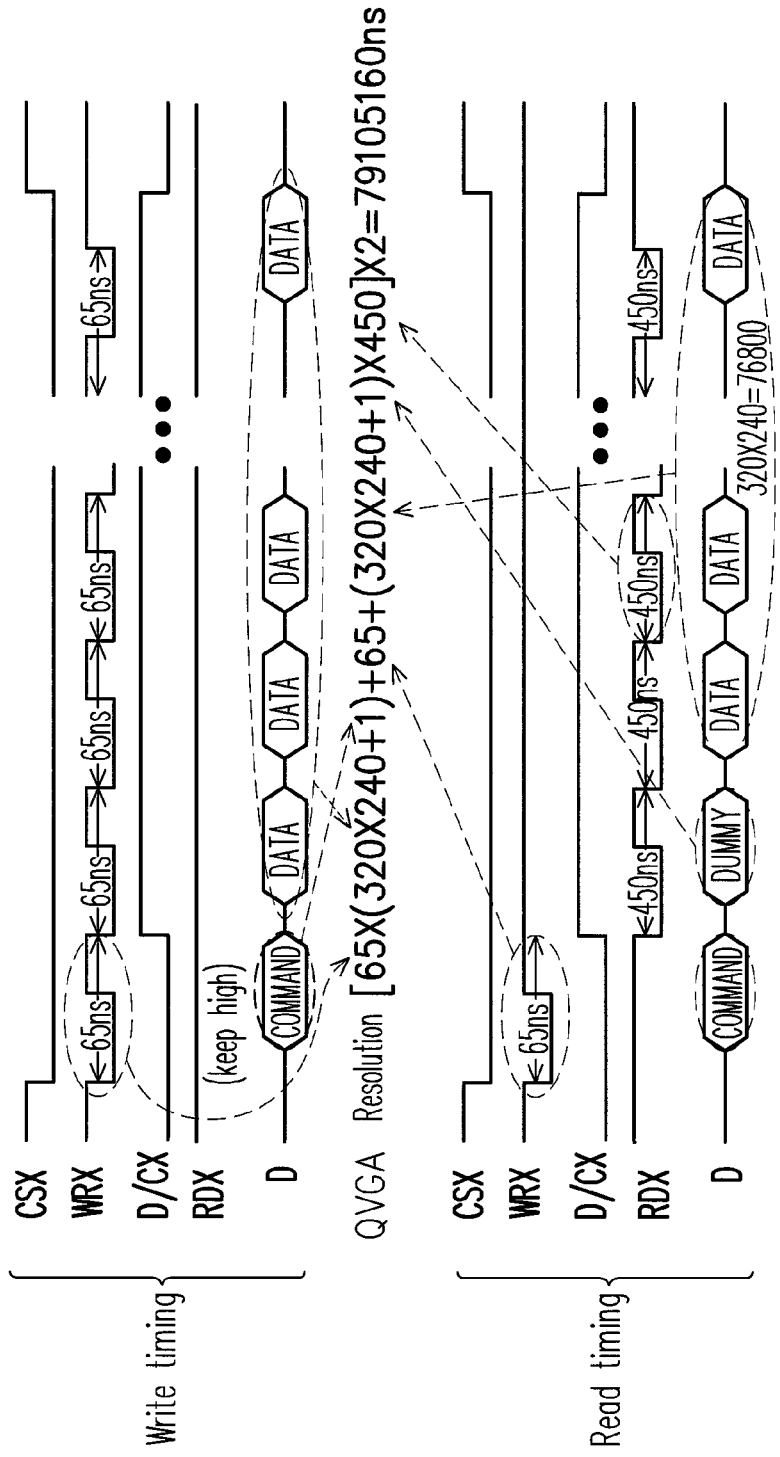
FIG. 2A is a timing diagram when a processor in FIG. 1C writes test patterns into and reads test patterns from a display controller driver having a QVGA resolution (i.e., 240×320).
Figure 2B:
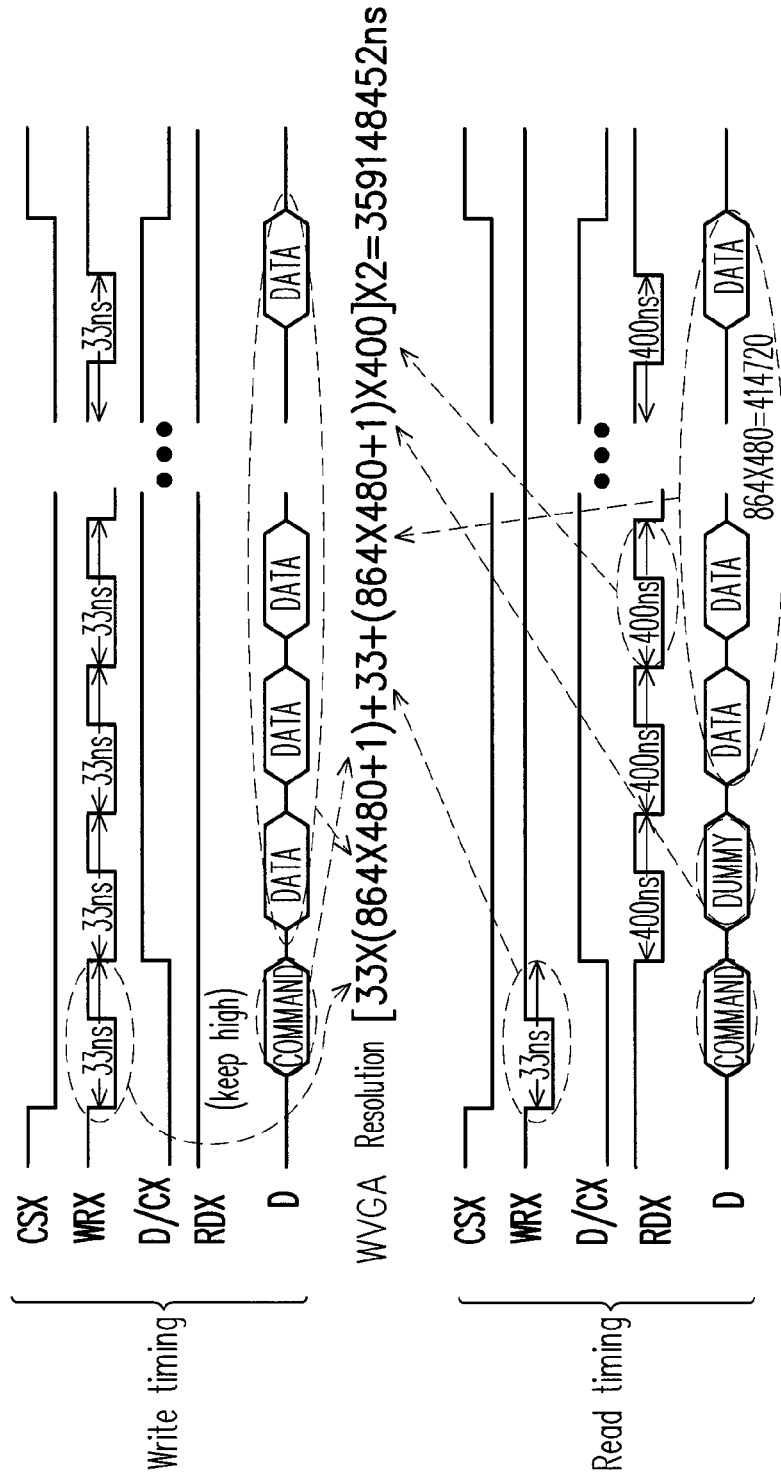
FIG. 2B is a timing diagram when the processor in FIG. 1C writes test patterns into and reads test patterns from a display controller driver having a WVGA resolution (i.e., 480×864).

Reference will now be made in detail to the present preferred embodiments of the invention, examples of which are illustrated in the accompanying drawings. Wherever possible, the same reference numbers are used in the drawings and the description to refer to the same or like parts.

Figure 3A:
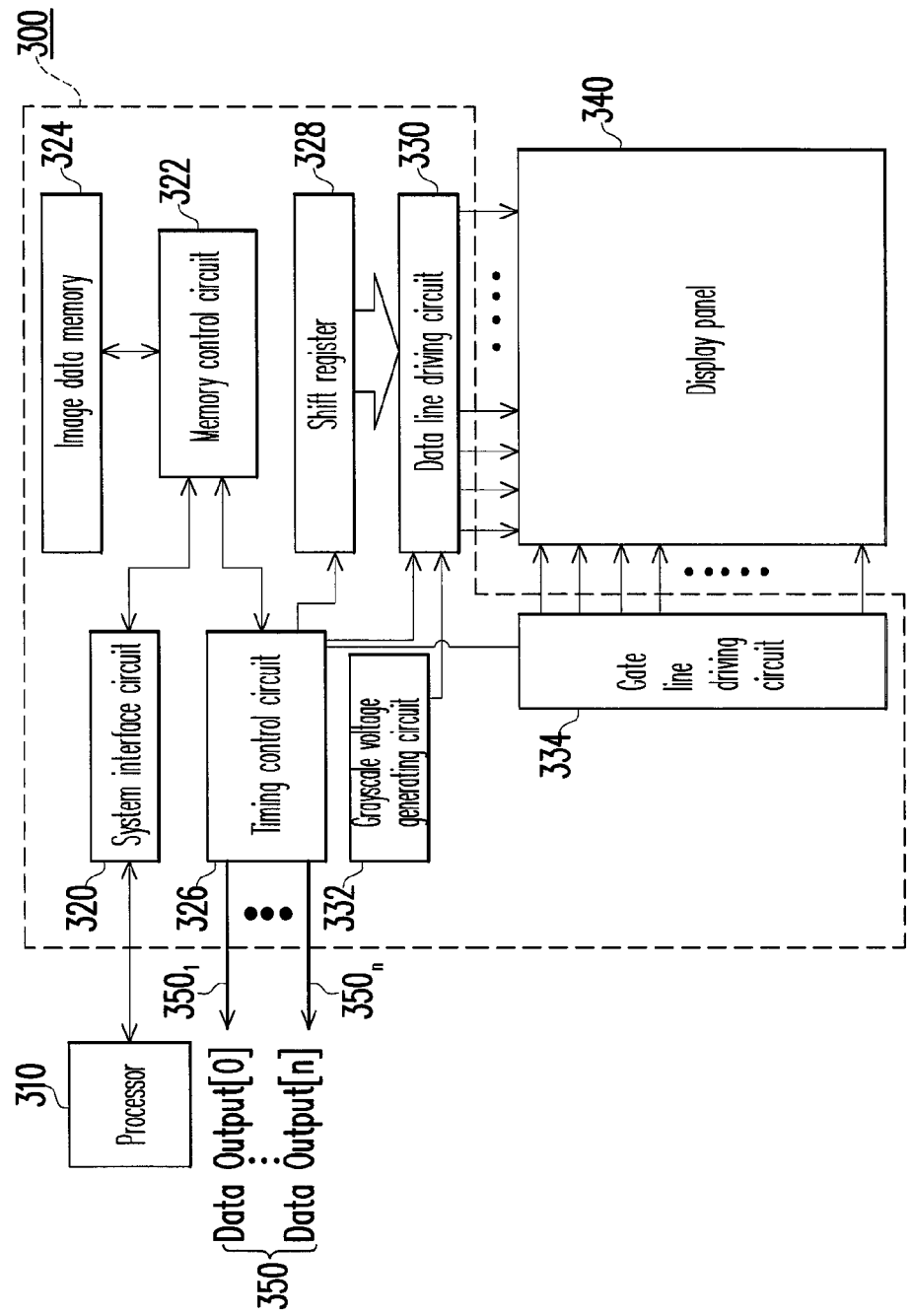
FIG. 3A is a block diagram of a display controller driver according to an embodiment of the invention.

FIG. 3A is a block diagram of a display controller driver according to an embodiment of the invention. Referring to FIG. 3A, the display controller driver 300 includes a system interface circuit 320, a memory control circuit 322, an image data memory 324, a timing control circuit 326, a shift register 328, a data line driving circuit 330, a grayscale voltage generating circuit 332, and a gate line driving circuit 334. The system interface circuit 320 is coupled to an external processor 310. The data line driving circuit 330 and the gate line driving circuit 334 may be coupled to a display panel 340 or a measurement instrument on an external test platform. In a normal operation mode, the display controller driver 300 is connected to a external processor 310 and a display panel 340. The processor 310 and the display panel 340 may be an internal processor and a display component of a display device, a handheld electronic device (for example, a cell phone or a personal digital assistant (PDA), or any other electronic device. The data line driving circuit 330 converts display data provided by the timing control circuit 326 into a corresponding grayscale voltage signal and outputs the grayscale voltage signal to the display panel 340 through a plurality of data-line output terminals of the display controller driver 300. In a test operation mode, the processor 310 may also be a processor of an external test platform.

In the present embodiment, the display controller driver 300 further includes at least one test output port 350. The timing control circuit 326 further includes a corresponding output terminal coupled to the test output port 350 of the display controller driver 300. The timing control circuit 326 outputs display data to the outside of the display controller driver 300 through the test output port 350. The test output port 350 may be one of existing output terminals or an additional output port, which is not limited in the present embodiment. In an embodiment, the test output port 350 includes output terminals $350_1$-$350_n$ in multiple bits. For example, the data output bits Data Output[0]-Data Output[n] in FIG. 3A are respectively corresponding to the output terminals $350_1$-$350_n$, wherein n is an integer. The bit number n can be determined according to the design requirement to make the test output port 350 to have different number of output terminals.

When the display controller driver 300 works in a normal operation mode, the external processor 310 transmits display data to the memory control circuit 322 through the system interface circuit 320. The memory control circuit 322 temporarily stores the display data into the image data memory 324. The timing control circuit 326 issues control signals to the memory control circuit 322, the shift register 328, the data line driving circuit 330, the gate line driving circuit 334, and the grayscale voltage generating circuit 332 in time sequence.

For example, the timing control circuit 326 issues control signals to read display data from the image data memory 324 to the timing control circuit 326 through the memory control circuit 322 and transmit the display data from the timing control circuit 326 to the shift register 328. The shift register 328 latches the display data according to a latch pulse of the timing control circuit 326 and transmits the latched display data to the data line driving circuit 330. The timing control circuit 326 further controls the data line driving circuit 330 and the gate line driving circuit 334 to transmit the display data into pixels of the display panel 340, so as to display a corresponding image. In the normal operation mode, the test output port 350 of the display controller driver 300 is turned off so that it does not output any signal.

Figure 3B:
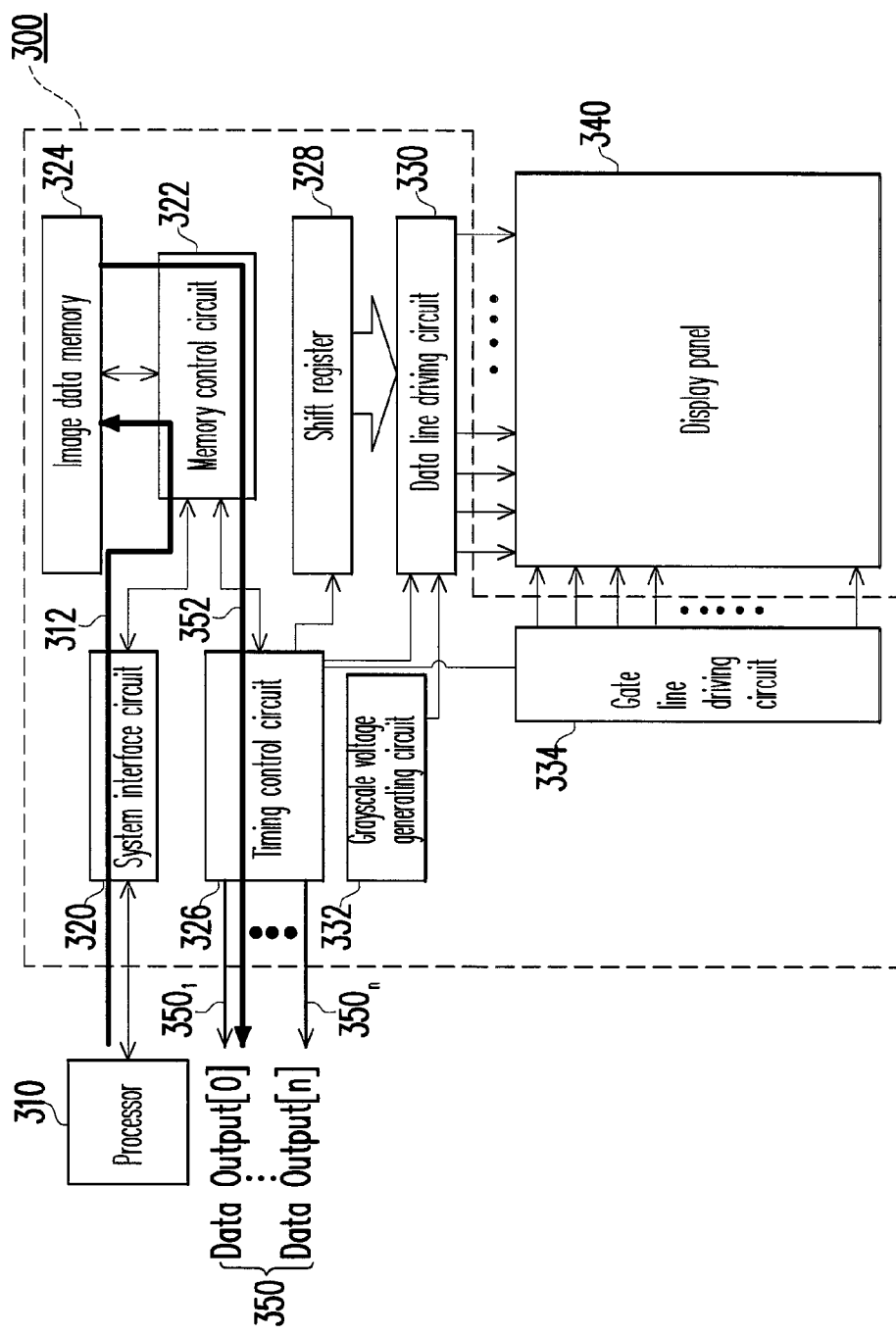
FIG. 3B is a diagram illustrating test pattern transmission paths of the display controller driver in FIG. 3A in a test operation mode according to an embodiment of the invention.

When a test operation is performed on the display controller driver 300, the display controller driver 300 works in a test operation mode. In the test operation mode, an external test platform (i.e., the processor 310) tests the image data memory 324 to determine whether display data or test patterns can be correctly stored in the image data memory 324. FIG. 3B is a diagram illustrating test pattern transmission paths of the display controller driver 300 in FIG. 3A in the test operation mode according to an embodiment of the invention. Referring to FIG. 3B, in the test operation mode, the transmission paths of a test pattern include a write path 312 and a read path 352. The write path 312 is sequentially composed of the processor 310, the system interface circuit 320, the memory control circuit 322, and the image data memory 324. The read path 352 is sequentially composed of the image data memory 324, the memory control circuit 322, the timing control circuit 326, and the test output port 350. A measurement instrument (for example, the processor 310 or another circuit) on the external test platform reads a test pattern from the test output port 350 and then determines whether the test is passed. Because different transmission paths 312 and 352 are used during the entire testing operation, no communication protocol for the transmission interface needs to be adopted and accordingly the testing time is shortened.

Figure 4A:
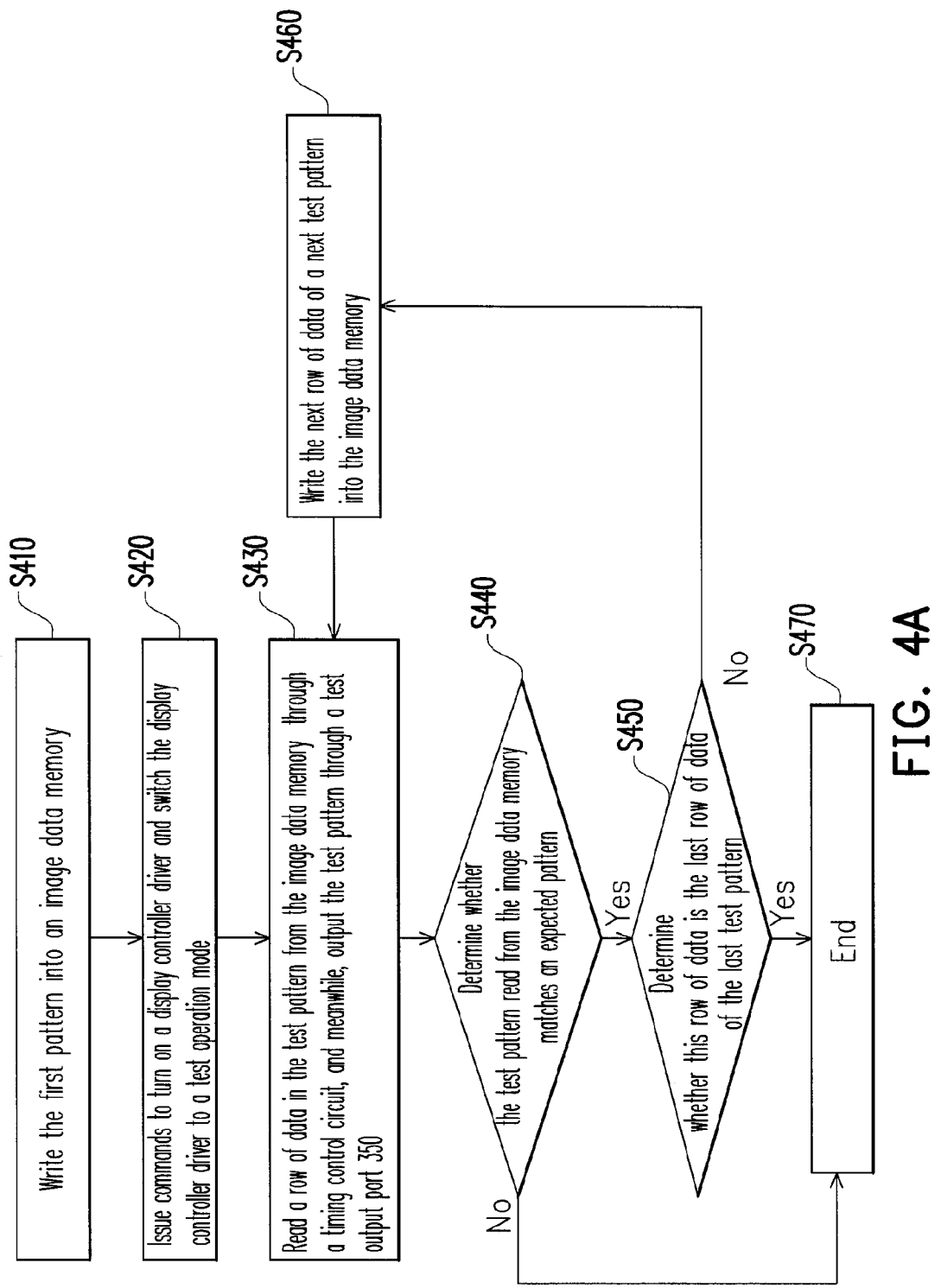
FIG. 4A illustrates operation flows of writing test patterns into and reading test patterns from the display controller driver in FIG. 3B according to an embodiment of the invention.

FIG. 4A illustrates operation flows of writing test patterns into and reading test patterns from the display controller driver 300 in FIG. 3B according to an embodiment of the invention. Referring to FIG. 4A, first, in step S410, a first test pattern is written into the image data memory 324 via the write path 312. Then, in step S420, the display controller driver 300 is turned on and switched to the test operation mode according to commands (for example, "Sleep out", "Display on", and "Turn on test mode") issued by the processor 310. Next, in step S430, a row of data of the test pattern is read from the image data memory 324 via the read path 352 (through the timing control circuit 326), and meanwhile, the test pattern is output to the outside of the display controller driver 300 through the timing control circuit 326 and the test output port 350. Next, in step S440, a measurement instruction (for example, the processor 310 or another circuit) on an external test platform determines whether the test pattern read from the image data memory 324 through the timing control circuit 326 matches an expected pattern. If the test pattern read from the image data memory 324 does not match the expected pattern, the test is not passed, and the test flow ends in step S470. If it is determined in step S440 that the test pattern output by the test output port 350 matches the expected pattern, the test is passed. After that, in step S450, whether this row of data is the last row of data of the last test pattern is determined. If so, the test flow ends in step S470. If it is determined in step S450 that this row is not the last row of the last test pattern, in step S460, the processor 310 writes the next row of data of another test pattern into the image data memory 324 via the write path 312 and continues to test the next row of data in step S430.

Figure 4B:
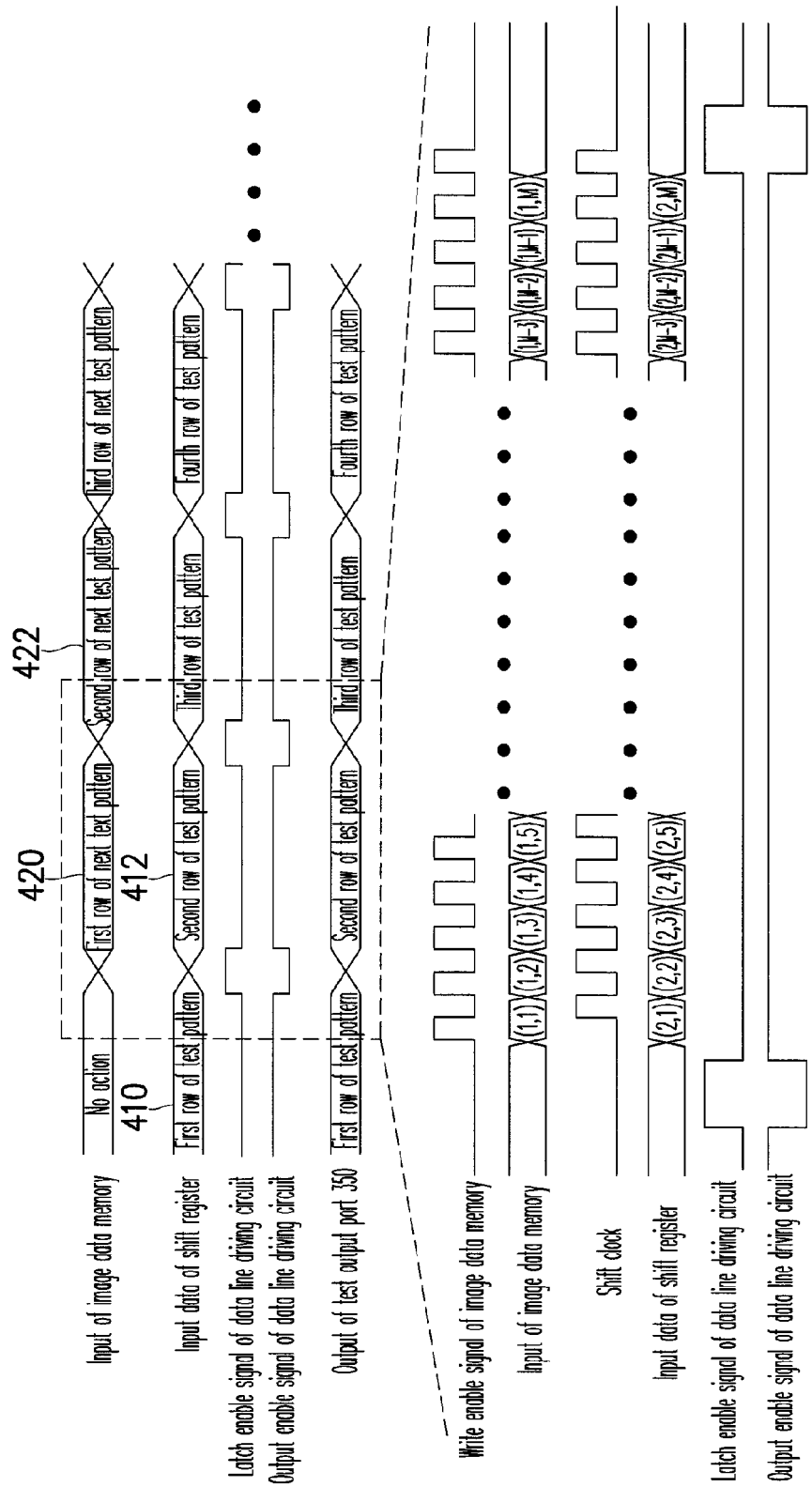
FIG. 4B is a signal timing diagram of the display controller driver in FIG. 3B in the test operation mode according to an embodiment of the invention.

FIG. 4B is a signal timing diagram of writing test patterns into and reading test patterns from the display controller driver 300 in FIG. 3B in the test operation mode according to an embodiment of the invention. The timing control circuit 326 reads a row of a test pattern from the image data memory 324 through the memory control circuit 322 and inputs the row of data into the shift register 328. Meanwhile, the timing control circuit 326 outputs the row of test pattern to the outside of the display controller driver 300 to be compared through the timing control circuit 326 and the test output port 350. After each row of the test pattern is transmitted to the shift register 328, a row of data in the next test pattern is stored into the image data memory 324 via the write path 312. As shown in FIG. 4B, when the first row of data (as indicated with the number 410) in the current test pattern (referred to as the first test pattern thereinafter) is input from the timing control circuit 326 to the shift register 328, the test output port 350 also outputs the first row of data 410 in the first test pattern to a measurement instrument (for example, the processor 310 or another circuit) of an external test platform to be compared. After that, the first row of data (as indicated with the number 420) in the next test pattern (referred to as the second test pattern thereinafter) is stored into the image data memory 324 via the write path 312. Meanwhile, the timing control circuit 326 sequentially inputs the second row of data (as indicated with the number 412) in the first test pattern into the shift register 328 and outputs the second row of data 412 in the first test pattern to the measurement instrument (for example, the processor 310 or another circuit) on the external test platform to be compared through the test output port 350.

Similarly, the second row of data (as indicated with the number 422) in the next test pattern (i.e., the second test pattern) is stored into the image data memory 324 via the write path 312. Meanwhile, the timing control circuit 326 inputs the third row of data in the first test pattern into the shift register 328 and outputs the third row of data in the first test pattern to the measurement instrument (for example, the processor 310 or another circuit) on the external test platform to be compared through the test output port 350. Data in each row of the test patterns is processed in the time sequence described above.

As described above, when the display controller driver 300 works in the test operation mode, test patterns are transmitted via different transmission paths 312 and 352. Thus, no communication protocol or restriction on transmission channel needs to be taken into consideration regarding the transmission interface of the display controller driver 300, and accordingly the testing time can be greatly shortened.

Figure 5A:
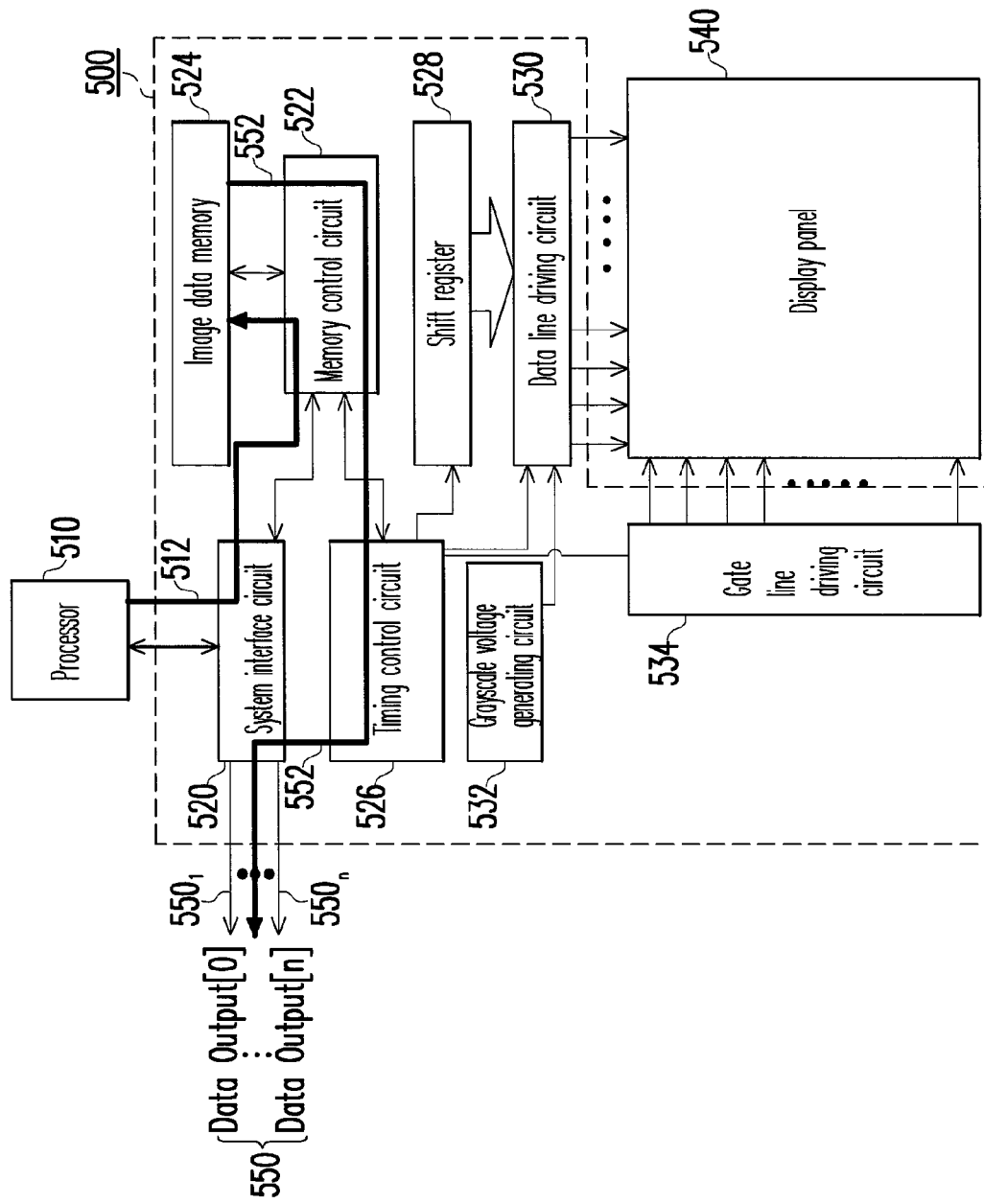
FIG. 5A is a diagram illustrating test pattern transmission paths of a display controller driver in a test operation mode according to another embodiment of the invention.

FIG. 5A is a diagram illustrating test pattern transmission paths of a display controller driver in the test operation mode according to another embodiment of the invention. Referring to FIG. 5A, the display controller driver 500 is connected to a processor 510 and a display panel 540. The display controller driver 500 includes a system interface circuit 520, a memory control circuit 522, an image data memory 524, a timing control circuit 526, a shift register 528, a data line driving circuit 530, a grayscale voltage generating circuit 532, and a gate line driving circuit 534.

The embodiment illustrated in FIG. 5A can be referred to descriptions related to FIG. 3A and FIG. 3B. Unlike that in the embodiment illustrated in FIG. 3A and FIG. 3B, in the present embodiment, the test output port 550 of the display controller driver 500 is coupled to a system interface circuit 520. The timing control circuit 526 outputs display data through the system interface circuit 520 and the test output port 550. The test output port 550 may be one or a part of existing output terminals or an additional output port, which is not limited in the present embodiment. In an embodiment, the test output port 550 includes output terminals $550_1$-$550_n$ in multiple bits. For example, the data output bits Data Output[0]-Data Output[n] in FIG. 5A are respectively corresponding to the output terminals $550_1$-$550_n$, wherein n is an integer. The bit number n can be determined according to the design requirement to make the test output port 550 to have different number of output terminals.

When the display controller driver 500 works in a normal operation mode, the external processor 510 transmits display data to the memory control circuit 522 through the system interface circuit 520. The memory control circuit 522 temporarily stores the display data into the image data memory 524. The timing control circuit 526 issues control signals to the memory control circuit 522, the shift register 528, the data line driving circuit 530, the gate line driving circuit 534, and the grayscale voltage generating circuit 532 in time sequence. The operation flow of the display controller driver 500 in the normal operation mode can be referred to the descriptions related to FIG. 3A therefore will not be described herein. In the normal operation mode, the test output port 550 is turned off and does not output any signal.

Figure 5B:
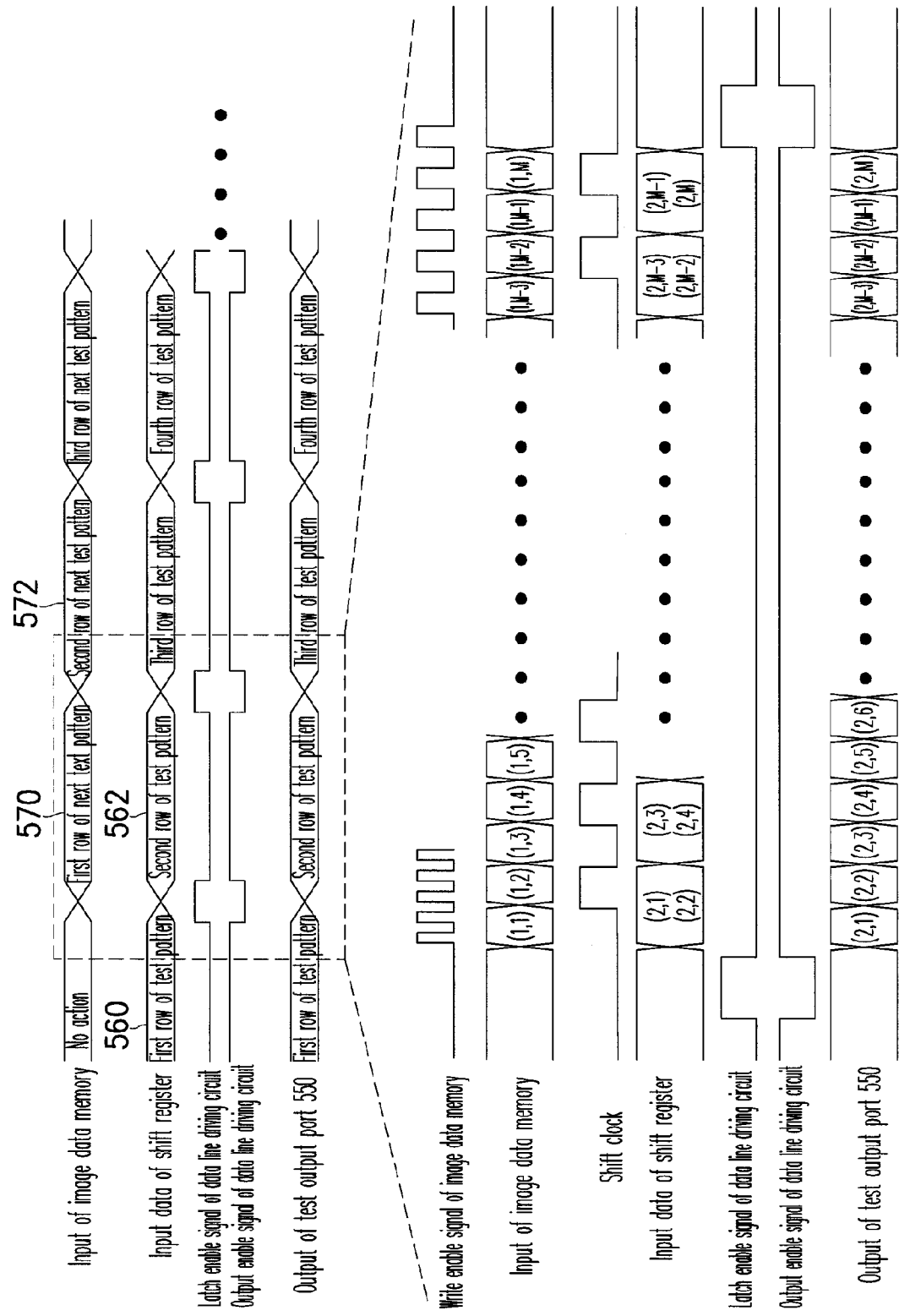
FIG. 5B is a signal timing diagram of the display controller driver in FIG. 5A in the test operation mode according to another embodiment of the invention.

When a test operation is performed on the display controller driver 500, the display controller driver 500 works in the test operation mode. The operation flow of the display controller driver 500 in the test operation mode can be referred to the descriptions related to FIG. 4A. In the test operation mode, the processor 510 on the external test platform tests the image data memory 524 to determine whether display data or test patterns can be correctly stored into the image data memory 524. FIG. 5B is a signal timing diagram of the display controller driver 500 in FIG. 5A in the test operation mode according to another embodiment of the invention. Referring to FIG. 5A, in the test operation mode, the transmission paths of a test pattern include a write path 512 and a read path 552. The write path 512 is sequentially composed of the processor 510, the system interface circuit 520, the memory control circuit 522, and the image data memory 524. The read path 552 is sequentially composed of the image data memory 524, the memory control circuit 522, the timing control circuit 526, the system interface circuit 520, and the test output port 550. A measurement instrument (for example, the processor 510 or another circuit) on the external test platform reads a test pattern from the test output port 550 and then determines whether the test is passed. Because different transmission paths 512 and 552 are used during the entire testing operation, no communication protocol for the transmission interface needs to be adopted and accordingly the testing time is shortened.

FIG. 5B is a signal timing diagram of writing test patterns into and reading test patterns from the display controller driver 500 in FIG. 5A in the test operation mode according to another embodiment of the invention. The timing control circuit 526 reads a row of a test pattern from the image data memory 524 through the memory control circuit 522 and then inputs the row of test pattern into the shift register 528. Meanwhile, the timing control circuit 526 outputs the row of test pattern to the outside of the display controller driver 500 to be compared through the system interface circuit 520 and the test output port 550. The timing control circuit 526 transmits two test data to the shift register 528 during each transmission period. Meanwhile, the test output port 550 outputs this two test data in a time division multiplexing manner.

When each row of test pattern is transmitted to the shift register 528, a row of data in the next test pattern is stored into the image data memory 524 via the write path 512. As shown in FIG. 5B, the timing control circuit 526 reads the first row of data (as indicated with the number 560) in the current test pattern (referred to as the first test pattern thereinafter) from the image data memory 524 through the memory control circuit 522. The timing control circuit 526 then inputs the first row of data 560 into the shift register 528 and transmits the first row of data 560 to the system interface circuit 520. When the timing control circuit 526 inputs the first row of data 560 into the shift register 528, the system interface circuit 520 outputs the first row of data 560 in the first test pattern to a measurement instrument (for example, the processor 510 or another circuit) on an external test platform to be compared through the test output port 550 in a time division multiplexing manner. Thereafter, the first row of data (indicated with a number 570) in the next test pattern (referred to as the second test pattern thereinafter) is stored into the image data memory 524 via the write path 512. Meanwhile, the timing control circuit 526 sequentially inputs the second row of data (indicated with the number 562) in the first test pattern into the shift register 528 and outputs the second row of data 562 in the first test pattern to a measurement instrument (for example, the processor 510 or another circuit) on the external test platform to be compared through the test output port 550.

Similarly, the second row of data (as indicated with the number 572) in the next test pattern (i.e., the second test pattern) is stored into the image data memory 524 via the write path 512. Meanwhile, the timing control circuit 526 inputs the third row of data in the first test pattern into the shift register 528 and outputs the third row of data in the first test pattern to a measurement instrument (for example, the processor 510 or another circuit) on the external test platform to be compared through the system interface circuit 520 and the test output port 550. Data in each row of the test patterns is processed in the time sequence described above.

Generally, the frames per second (FPS) of a display panel is above 60 Hz. Namely, a display controller driver needs to drive more than 60 frames during each second (i.e., the timing control circuit needs to read all the display data in the image data memory more than 60 times during each second). If a display controller driver is set to have a FPS of 60 Hz, the duration of each frame is about 16.6 ms (i.e., the timing control circuit performs a read operation on all the display data in the image data memory during the 16.6 ms). The time required by one test operation performed by the display controller driver 300 or 500 in foregoing embodiments in the test operation mode can be determined through following analysis.

Taking a resolution QVGA (i.e., 240×320) as an example and assuming that a write cycle is 65 nanoseconds (ns), if two test patterns are used for executing one test operation, the time for executing the test operation is:

$$2\times 16.6 \text{ ms} + 65\times(320\times 240+1)\text{ns} \approx 38.2 \text{ ms};$$

Taking a resolution WVGA (i.e., 480×864) as an example and assuming that a write cycle is 33 ns, if two test patterns are used for executing one test operation, the time for executing the test operation is:

$$2\times 16.6 \text{ ms} + 33\times(864\times 480+1)\text{ns} \approx 46.87 \text{ ms}.$$

As described above, under the same conditions, a test operation performed on a conventional display controller driver having a QVGA resolution takes 79 ms, while a test operation performed on a conventional display controller driver having a WVGA resolution takes 359 ms. Thus, the display controller drivers 300 and 500 described in foregoing embodiments can greatly shorten the testing time.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display controller driver, comprising:
    an image data memory, storing a display data;
    a timing control circuit, obtaining the display data from the image data memory; and
    a data line driving circuit, coupled to the timing control circuit for receiving the display data, and outputting a grayscale voltage signal corresponding to the display data through at least one data-line output terminal of the display controller driver;
    wherein in a test operation mode, the display data is written into the image data memory via a write path, and the timing control circuit further transmits the display data from the image data memory to at least one test output port of the display controller driver via a read path different from the write path, so as to output the display data to an external test platform outside of the display controller driver.

2. The display controller driver according to claim 1, wherein the timing control circuit further comprises at least one output terminal coupled to the test output port, and in the test operation mode, the timing control circuit transmits the display data from the image data memory to the test output port through the output terminal.

3. The display controller driver according to claim 1 further comprising:
    a system interface circuit, providing a communication interface between the display controller driver and an external processor;
    wherein the external processor stores the display data into the image data memory through the system interface circuit.

4. The display controller driver according to claim 3 further comprising:
    a memory control circuit, coupled between the system interface circuit and the image data memory;
    wherein the external processor stores the display data into the image data memory through the system interface circuit and the memory control circuit, and the timing control circuit obtains the display data from the image data memory through the memory control circuit.

5. The display controller driver according to claim 3, wherein the system interface circuit is coupled to the test output port, and in the test operation mode, the timing control circuit transmits the display data from the image data memory to the test output port through the system interface circuit.

6. The display controller driver according to claim 1, wherein when the display controller driver works in a normal operation mode, the test output port is turned off and does not output any signal.

7. The display controller driver according to claim 1 further comprising:
    a shift register, coupled between the timing control circuit and the data line driving circuit;

wherein the timing control circuit transmits the display data from the image data memory to the data line driving circuit through the shift register.

8. A testing method of a display controller driver, wherein the display controller driver comprises a timing control circuit, an image data memory, and a data line driving circuit, the testing method comprising:
   storing a display data into the image data memory;
   transmitting the display data from the image data memory to the timing control circuit;
   transmitting the display data from the timing control circuit to the data line driving circuit, wherein the data line driving circuit outputs a grayscale voltage signal corresponding to the display data through at least one data-line output terminal of the display controller driver;
   writing the display data into the image data memory via a write path in a test operation mode; and
   transmitting the display data got from the image data memory to at least one test output port of the display controller driver via a read path different from the write path in the test operation mode by the timing control circuit, so as to output the display data to an external test platform outside of the display controller driver.

9. The testing method according to claim 8, wherein the timing control circuit comprises at least one output terminal coupled to the test output port, and in the test operation mode, the timing control circuit transmits the display data got from the image data memory to the test output port through the output terminal.

10. The testing method according to claim 8, wherein the display controller driver further comprises a system interface circuit which provides a communication interface between the display controller driver and an external processor, and the external processor stores the display data into the image data memory through the system interface circuit.

11. The testing method according to claim 10, wherein the display controller driver further comprises a memory control circuit coupled between the system interface circuit and the image data memory, the external processor stores the display data into the image data memory through the system interface circuit and the memory control circuit, and the timing control circuit obtains the display data from the image data memory through the memory control circuit.

12. The testing method according to claim 10, wherein the system interface circuit is coupled to the test output port, and the timing control circuit transmits the display data got from the image data memory to the test output port through the system interface circuit in the test operation mode.

13. The testing method according to claim 8 further comprising:
   turning off the test output port in a normal operation mode, so that the test output port does not output any signal.

14. The testing method according to claim 8, wherein the display controller driver further comprises a shift register coupled between the timing control circuit and the data line driving circuit, and the testing method further comprises:
   transmitting the display data got from the image data memory from the timing control circuit to the data line driving circuit through the shift register.

* * * * *

UNITED STATES PATENT AND TRADEMARK OFFICE
CERTIFICATE OF CORRECTION

| | | |
|---|---|---|
| PATENT NO. | : 8,963,937 B2 | Page 1 of 1 |
| APPLICATION NO. | : 13/211336 | |
| DATED | : February 24, 2015 | |
| INVENTOR(S) | : Hsing-Chien Yang | |

It is certified that error appears in the above-identified patent and that said Letters Patent is hereby corrected as shown below:

On The Title Page, add the item (30) Foreign Priority Application Data --
June 23, 2011 (TW)..... 100121981.

Signed and Sealed this
Twentieth Day of October, 2015

Michelle K. Lee
*Director of the United States Patent and Trademark Office*